United States Patent
Shih et al.

(10) Patent No.: US 7,711,693 B2
(45) Date of Patent: May 4, 2010

(54) DEPLOYMENT OF LIFE-CYCLE MODEL FOR LDAP APPLICATIONS

(75) Inventors: Daniel Shih, San Jose, CA (US); Amit Sharma, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 866 days.

(21) Appl. No.: 11/292,945

(22) Filed: Dec. 2, 2005

(65) Prior Publication Data

US 2006/0155777 A1 Jul. 13, 2006

Related U.S. Application Data

(60) Provisional application No. 60/633,185, filed on Dec. 3, 2004.

(51) Int. Cl.
*G06F 17/30* (2006.01)

(52) U.S. Cl. .................................................. 707/102

(58) Field of Classification Search .............. 707/1–10, 707/100–104.1, 200–206
See application file for complete search history.

(56) References Cited

U.S. PATENT DOCUMENTS

| | | | |
|---|---|---|---|
| 5,826,085 A | 10/1998 | Bennett et al. | |
| 6,247,056 B1 | 6/2001 | Chou et al. | |
| 6,317,790 B1 | 11/2001 | Bowker et al. | |
| 6,381,605 B1 | 4/2002 | Kothuri et al. | |
| 6,470,344 B1 | 10/2002 | Kothuri et al. | |
| 6,502,102 B1 * | 12/2002 | Haswell et al. | ............. 707/102 |
| 6,505,205 B1 | 1/2003 | Kothuri et al. | |
| 6,523,027 B1 * | 2/2003 | Underwood | ................... 707/4 |
| 6,601,071 B1 | 7/2003 | Rowker et al. | |
| 6,845,505 B1 | 1/2005 | Adunuthula et al. | |
| 6,879,980 B1 | 4/2005 | Kothuri et al. | |
| 7,162,470 B2 | 1/2007 | Sharma et al. | |
| 7,243,138 B1 | 7/2007 | Majkut et al. | |
| 7,334,039 B1 | 2/2008 | Majkut et al. | |
| 7,376,636 B1 | 5/2008 | Wang et al. | |
| 7,421,658 B1 | 9/2008 | Sharma et al. | |
| 7,555,770 B2 | 6/2009 | Gottipati et al. | |
| 2003/0101223 A1 * | 5/2003 | Pace et al. | ................... 709/206 |
| 2004/0044691 A1 | 3/2004 | Wajda | |
| 2005/0188367 A1 * | 8/2005 | Oberholtzer | ................ 717/168 |
| 2006/0155778 A1 | 7/2006 | Sharma et al. | |
| 2006/0218147 A1 | 9/2006 | Shrivastava et al. | |
| 2007/0226710 A1 | 9/2007 | Sharma et al. | |
| 2009/0173780 A1 | 7/2009 | Ramamoorthy et al. | |

* cited by examiner

*Primary Examiner*—Diane Mizrahi
(74) *Attorney, Agent, or Firm*—Vista IP Law Group, LLP.

(57) ABSTRACT

Systems and methods for testing and deploying LDAP applications are disclosed. A test application may be tested in a test environment including a test directory. The test application may change data stored in the test directory. Furthermore, the test directory may be configured to receive changes from a production directory in a production environment. When the application is ready to be deployed, changes to the test directory are migrated to the production directory through reverse replication or application data migration. The application is configured to connect to the production directory, and the application is thereby deployed in the production environment.

23 Claims, 7 Drawing Sheets

Fig. 7

DEPLOYMENT OF LIFE-CYCLE MODEL FOR LDAP APPLICATIONS

RELATED APPLICATION

This application claims the benefit of U.S. Provisional Application No. 60/633,185, entitled "DEPLOYMENT OF LIFE-CYCLE MODEL FOR LDAP APPLICATIONS", filed Dec. 3, 2004, which is hereby incorporated by reference in its entirety.

FIELD

Embodiments of the invention relate to computer systems, and more particularly to testing and deploying software applications.

BACKGROUND OF THE INVENTION

Software applications may be taken through several stages before they are released. Software developers may develop and test a software application, quality assurance personnel may further test the software application, and the application may then be deployed to internal or external users.

Accordingly, there are many different environments in which a software application may operated. For example, the life cycle of a software application may include a test environment, a stage environment, and a production environment.

Application developers may test their applications in their own environments, known as test environments. Quality assurance personnel test all pilot applications in a stage environment. After they are deployed, software applications operate in a production environment.

Many software applications use directories to aid in fast lookup of information. One protocol that applications may use to look up information in various directories is known as Lightweight Directory Access Protocol (LDAP). Applications that use LDAP are known as LDAP applications.

In many systems, there are notable limitations in moving a LDAP application from the test and stage environments to the production environment. For example, in the test and stage environments, LDAP applications are running against a test LDAP directory whose data was originally copied from a production LDAP directory. The data in the test LDAP directory become obsolete after some time as it they not getting live updates from the production LDAP directory.

The test LDAP directory is not getting up to date production LDAP data. Consequently, the development/QA testing may not catch certain issues that would only occur if running against the up to date production LDAP data. In this case, the development/QA testing may not be sufficiently effective.

Furthermore, deploying an already tested LDAP application after stage testing requires re-installation and re-configuration of the LDAP application against the production LDAP directory. This creates much administration overhead and introduces production service downtime to verify the newly installed and configured LDAP application, even if the installation and configuration go smoothly. If any problems occur, the problem is further exacerbated.

SUMMARY

Accordingly, there is a need in the art for a simplified process for deploying LDAP applications. The present invention provides a seamless environment for moving applications from the test environment to the staging environment, and from there to the production environment.

Embodiments of the present invention provide a deployment life-cycle model for LDAP applications. Using the deployment life-cycle model, the test LDAP directory receives live production updates during the application pilot testing cycle. Furthermore, application metadata that is created in the test directory during the application pilot testing, may be migrated to the production directory. In addition, the association of an LDAP application with the test directory may be broken, and the LDAP application may be and re-associated with a production directory.

The deployment life cycle model may be used to deploy a new LDAP application in the production directory environment for the first time, or may be used to deploy a new version of a LDAP application that is already deployed in the production environment.

DETAILED DESCRIPTION

Overview

Figure 1:
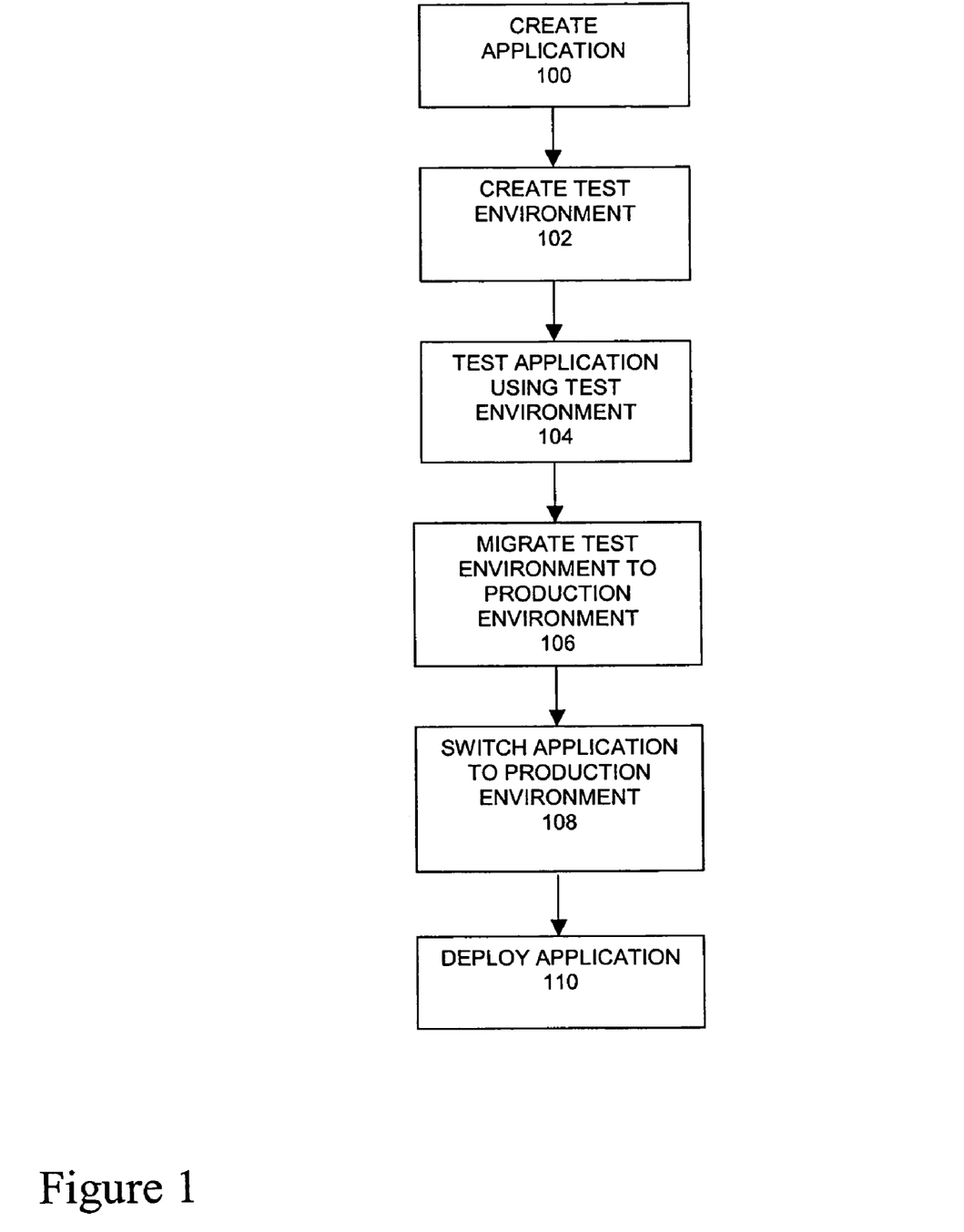
FIG. 1 is a flow chart depicting a method for testing and deploying applications, in accordance with an embodiment of the invention.

FIG. 1 is a flow chart depicting a method for deploying an LDAP application. As shown in FIG. 1, the method may begin in step 100, wherein an application may be created, for example, by a developer. The method may continue in step 102, wherein a test environment may be created. The test environment may include a test directory. The test directory may be configured to receive updates from a production directory via one-way replication. One-way replication will be discussed further below.

In step 104, the application may be tested in the test environment, for example, using the test directory.

When the application is ready to be deployed, in step 106, the test environment may be migrated to the production environment. This may include, for example, replicating changes in the test environment to the production environment. Migrating the test environment to the production environment may be performed via reverse replication or via application data migration. In step 108, the application may be switched to the production environment. This may include, for example, changing a pointer in the application to point to the production environment. In step 110, the application may be deployed.

Steps 104-110 may be repeated to deploy one LDAP application at a time until all new LDAP applications or new versions of the LDAP applications are deployed in the production environment.

Details of steps 100, 102, 104, and 106 will be described further with reference to FIGS. 2-6.

One-Way Replication

Embodiments of the invention provide for one-way replication from a production directory to a test directory. This one-way replication ensures the test directory continues to receive live updates from the production directory. With one-way replication, the directory data set of the test environment may be identical to the directory data set of the production environment. A system for one-way replication is illustrated in FIG. 2.

Figure 2:
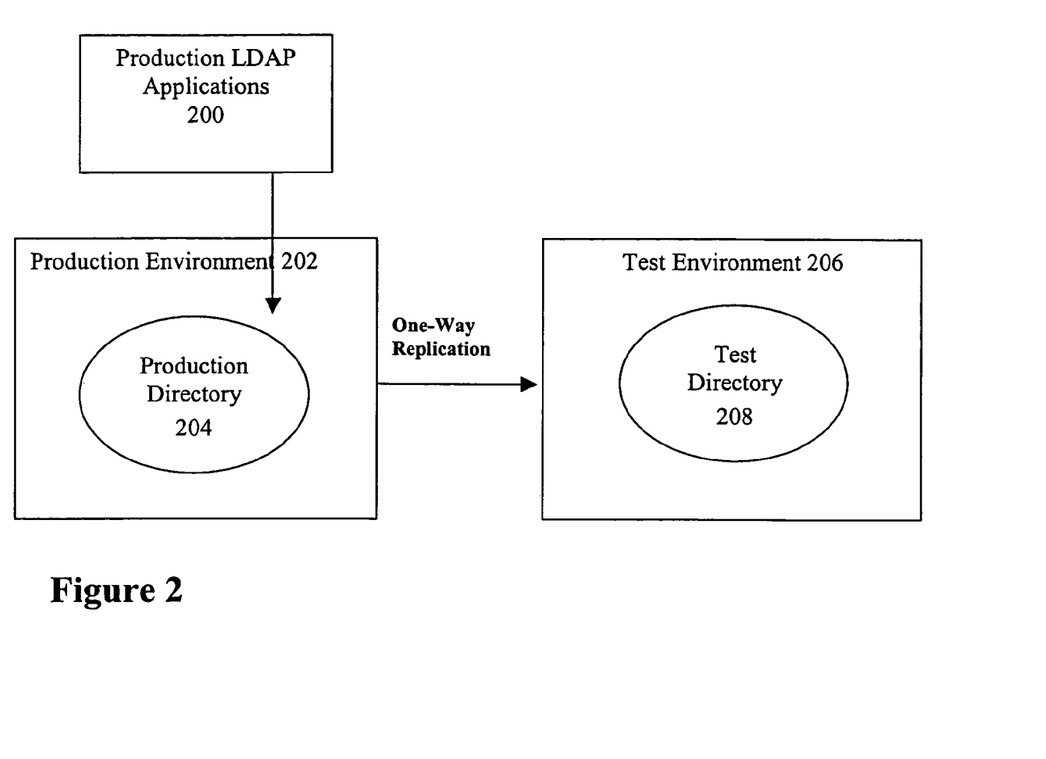
FIG. 2 is block diagram depicting a system for testing and deploying applications, in accordance with an embodiment of the invention.

Although the system of FIG. 2 is described in terms of one test directory replicating data from a production directory, multiple test directories can be configured to replicate from a single production directory. In this case, each test directory may be used for pilot testing independently.

As shown in FIG. 2, production LDAP applications 200, which are LDAP applications that have already been deployed, may operate in a production environment 202. Production applications may change data in a production directory 204.

A test environment 206 may be created in order to test new applications. The test environment 206 may include a test directory 208. Test directory 208 may be configured such that any changes made to production directory 204 are replicated in test directory 208. The replication of changes from production directory 204 to test directory 208 is known as one-way replication.

One-way replication may ensure that test directory 208 receives up-to-date information, allowing for more effective testing of applications in test environment 206.

Testing LDAP Applications

LDAP applications may be tested in the test environment 206, using the test directory 208. To begin testing, a "Begin Pilot Testing Cycle" command may be issued. The Begin Pilot Testing Cycle may record the testing starting time. The testing starting time may later be used, for example, for time based data migration from the test directory to the production directory when the pilot test ends.

Figure 3:
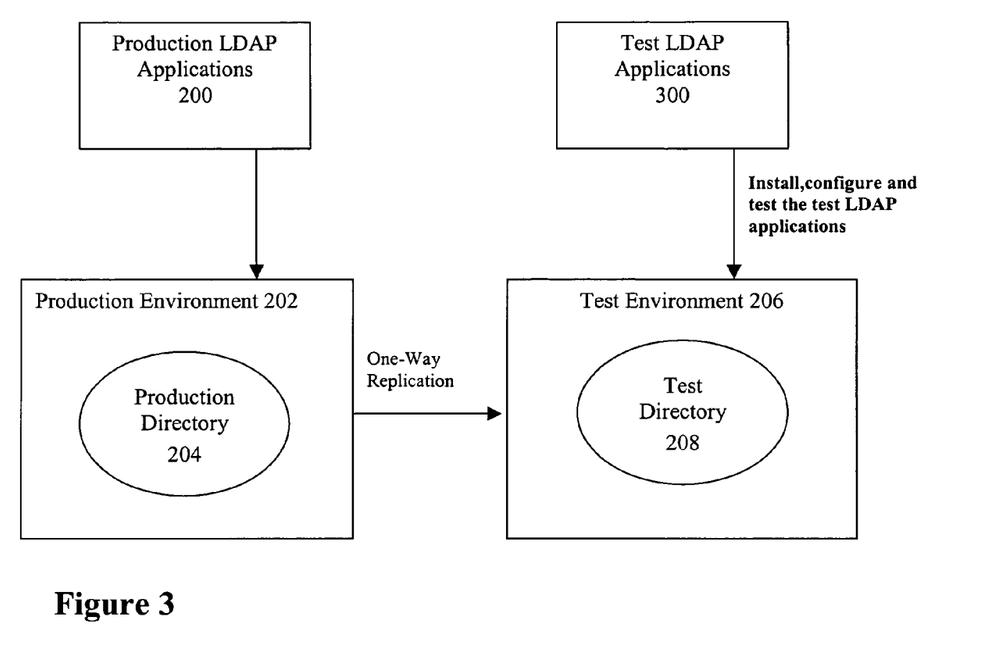
FIG. 3 is block diagram depicting a system for testing and deploying applications, in accordance with an embodiment of the invention.

FIG. 3 shows a system for testing LDAP applications. As shown in FIG. 3, one or more LDAP applications 300 may be tested in the test environment 206.

LDAP applications 300 may first be installed in the test environment 206. This may include, for example, setting a pointer in the LDAP applications to point to the test environment 206 or the test directory 208. LDAP applications 300 may then be configured. LDAP applications 300 may then be tested in the test environment 206, for example, against the test directory 208. During installation, configuration, and testing of the LDAP applications, application metadata may be added to test directory 208. Some or all of the application data (the data and metadata changed by the LDAP applications) may be propagated to the production directory 204. One method for propagating application data to the production directory is known as reverse replication. This method leverages OID's replication capability to automatically move wanted updates in the test OID environment back to production OID based upon Replication configuration. Another method for propagating application data to the production directory is known as application data migration. This method may give a database administrator or other user more control over the application data that will be migrated.

Application Data Migration

Application metadata may be migrated from the test directory to the production directory. A method for migrating application metadata is illustrated in FIG. 4.

Figure 4:
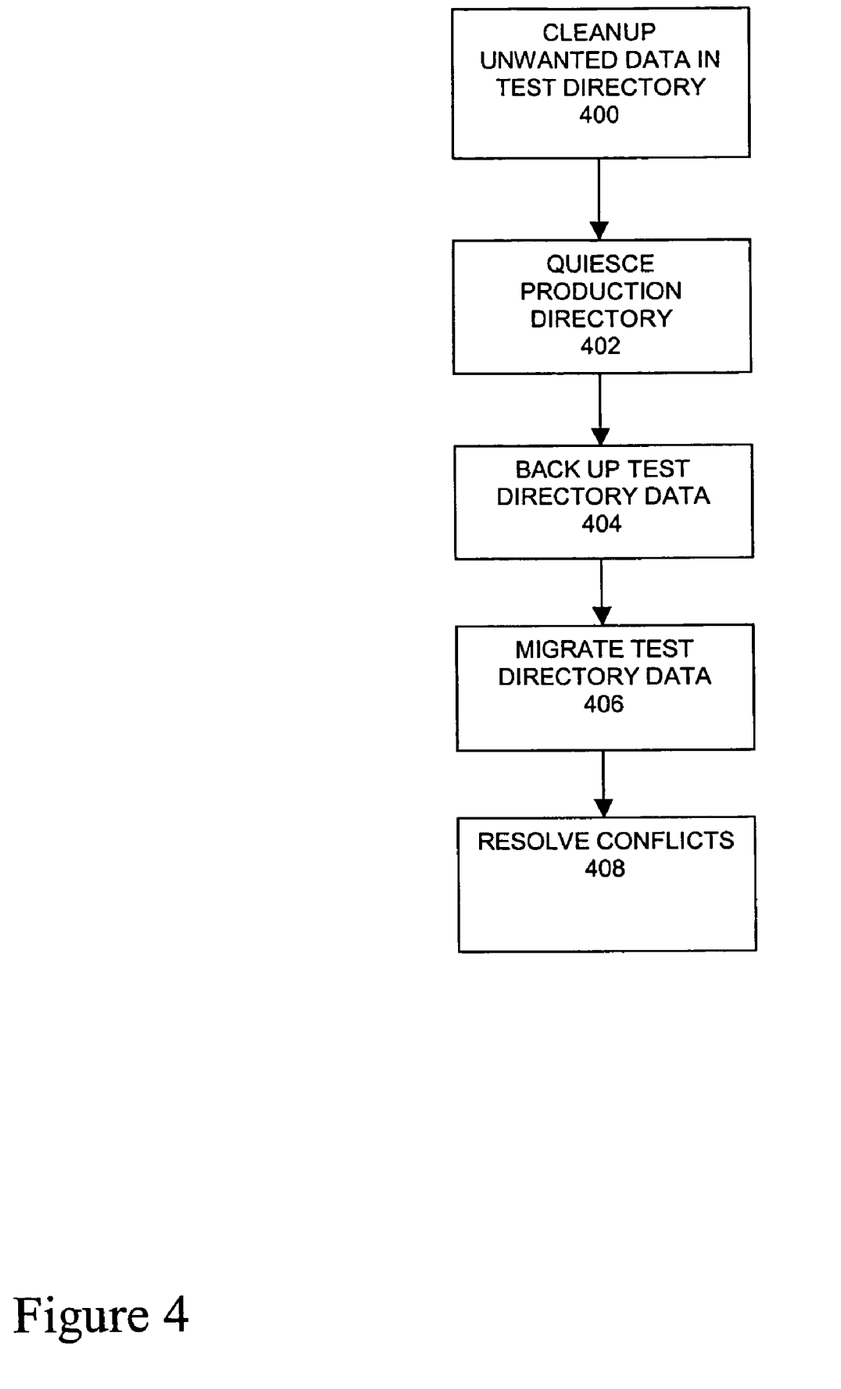
FIG. 4 is a flow chart depicting a method for application data migration, in accordance with an embodiment of the invention.

As shown in FIG. 4, the method may begin in step 400, wherein the test directory 208 may be cleaned up when testing of an application is complete. This may include, for example, deleting any changes that have been made to the test directory 208 that are not meant to be propagated to the production directory 204.

In step 402 the production distributed directory environment may be quiesced in preparation for data migration. The distributed directory environment is quiesced while the data migration from the test to the production environment takes place. This ensures that all production changes are in the test directory, thus the test directory has a super set of the data or the merged data from the test and the production directories.

In step 404, the test directory data may be backed up. The test directory data backed up may include, for example, all the data modified during testing. In this implementation, it may not be necessary to back up the changes that were migrated from the production directory, as those need not be migrated back to the production directory. In this implementation, backing up the test directory data may include searching all entries modified since the start of testing, not including the ones modified in the production directory. The entries found by the search may then be backed up.

In an alternate implementation, the LDAP administrator may have a choice to back up and migrate only the application metadata. The application metadata may be the minimum LDAP footprint needed for running a given application, without backing up/migrating pilot user data.

Figure 5:
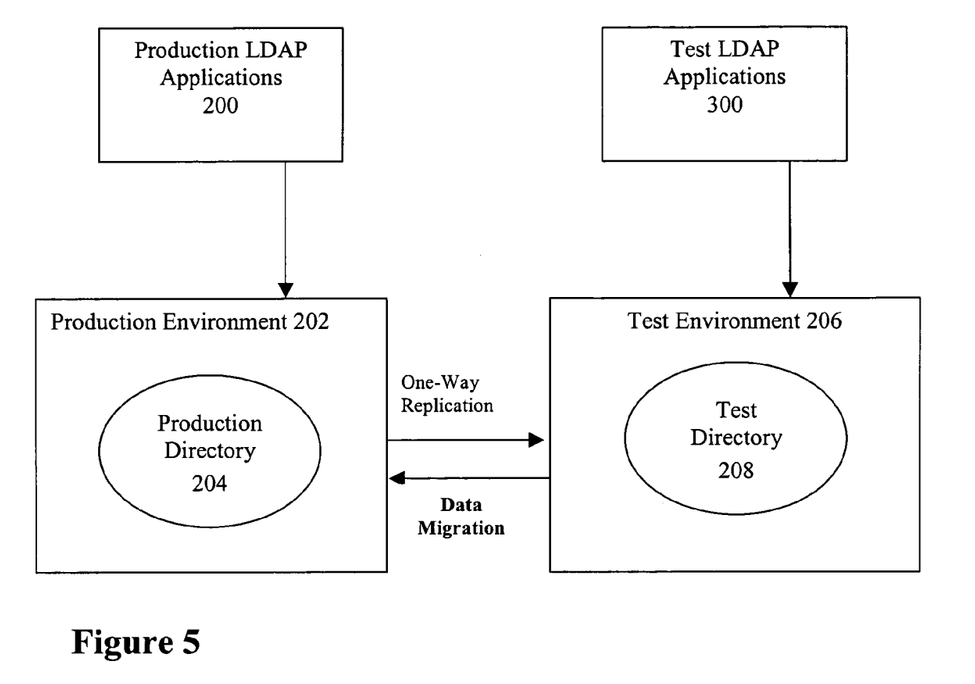
FIG. 5 is block diagram depicting a system for testing and deploying applications, in accordance with an embodiment of the invention.

In step 406, test directory data may be migrated to the production directory. Since the test directory has the merged data with the production directory, it is safe to migrate the modified entries from the test directory to the production directory, for example, as shown in FIG. 5.

In step 408, conflicts may be resolved while migrating the data to the production directory. It is possible that the data that is being migrated back to production already exists. In that case the content of the given production data/object may be replaced with the one in the test directory, since the test directory has the superset content from the production directory and the test directory.

In some embodiments, based on the results of testing, there is an option to abandon the test applications 300 and start another test cycle. For example, new or update test applications may be installed in the test environment 206 for testing.

Reverse Replication

Reverse replication provides an alternate means to migrate the pilot test data to production OID. It follows the same flow as the Application Data Migration procedure described above. However, it does not give the LDAP administrator the flexibility to migrate selective data (i.e., application meta data only). It instead replicates all pilot test changes (i.e., application meta data plus user data) to the production directory. But on the other hand, it provides the benefit of automated data migration and conflict resolution without the manual steps to backup and migrate data required by the Application Data Migration procedure.

Changing Applications to Use Production Directory

Figure 6:
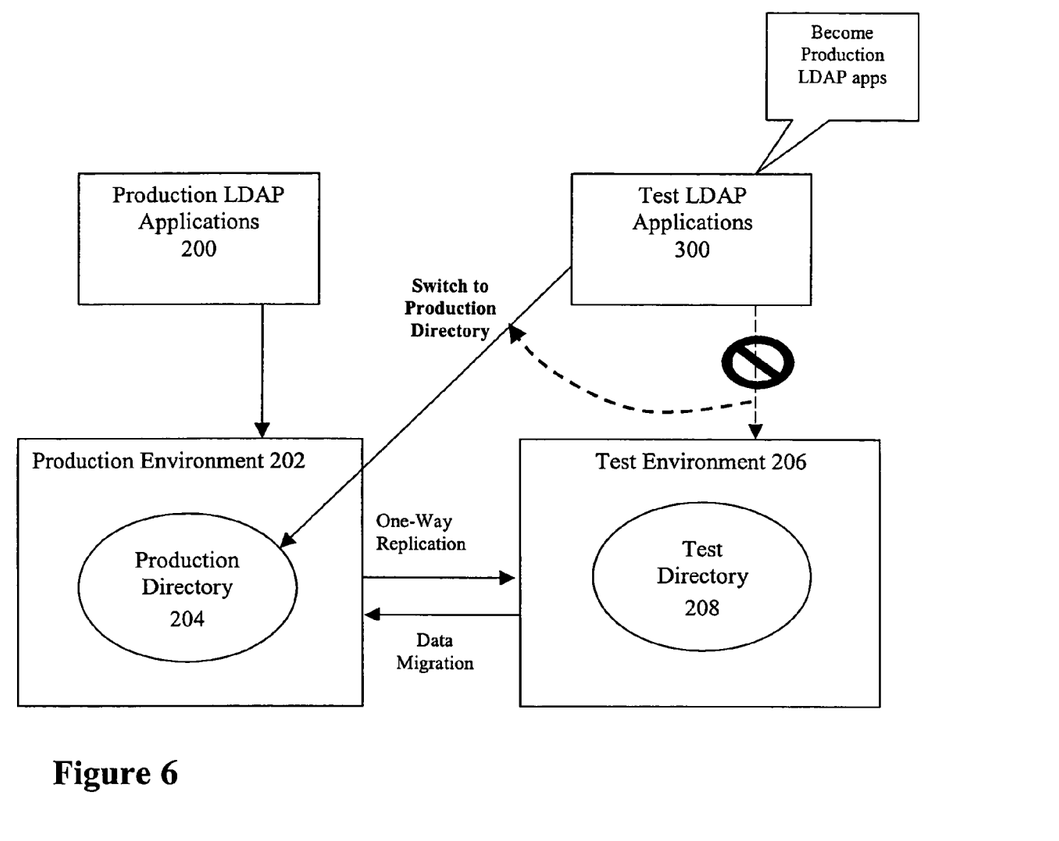
FIG. 6 is block diagram depicting a system for testing and deploying applications, in accordance with an embodiment of the invention.

After reverse replication or application data migration, the test application is changed to use the production directory. This may be accomplished, for example, by changing a pointer in the test application to point to the production directory, as shown in FIG. 6. The test application 300 now becomes a production application, given it is now pointing to the production directory along with other production LDAP applications 200.

At this stage the test infrastructure can be used for testing another test application 300.

Advantages And Applications

The invention offers many advantages over prior systems and methods of LDAP deployment. For example, the life-cycle model ensures that LDAP applications in the development and stage test environments are tested against up-to-date production data instead of an obsolete snapshot. This helps LDAP applications uncover and resolve issues before production.

With this solution, deploying a new LDAP application does not require reinstallation and reconfiguration of the tested LDAP application in the production environment, thus avoiding potential production service downtime caused by the installation, configuration and verification of the LDAP application in question.

Although the invention has been described in terms of LDAP applications, the invention can be applied to non LDAP applications that store their application metadata in a non LDAP repository. Other LDAP directory vendors can follow same methodology to implement test to stage to production life cycle model hence achieve seamless deployment for their LDAP applications.

System Architecture

Figure 7:
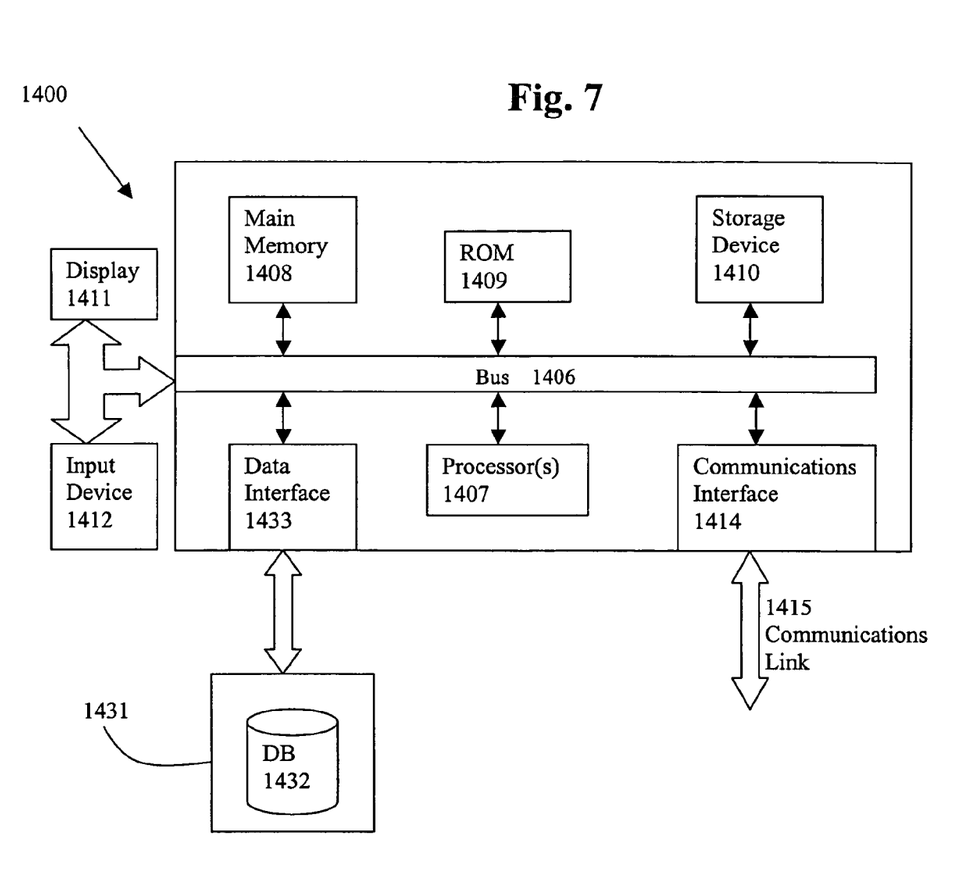
FIG. 7 is a block diagram of a computer system in which embodiments of the invention may be practiced.

The execution of the sequences of instructions required to practice the embodiments may be performed by a computer system 1400 as shown in FIG. 7. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 7, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Logic refers to software, hardware or any combination of software and hardware.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

We claim:

1. A computer-implemented method for deployment of LDAP applications comprising:
   creating a test environment for testing an LDAP application on a computer system comprising a processor, wherein data from a production environment is replicated to the test environment;
   testing, by using the processor of the computer system, an LDAP application installation configuration using the test environment;
   migrating the test environment to the production environment, wherein migrating the test environment comprises performing reverse replication of application data from the test environment to the production environment;
   switching an application production identity management services pointer from the test environment to the production environment; and
   storing the data in a volatile or non-volatile computer-usable medium or displaying the data on a display device.

2. The method of claim 1, wherein testing an LDAP application installation configuration comprises:
   recording a starting time of testing;
   replicating changes made in the production environment to the test environment; and
   storing the replicated changes.

3. The method of claim 1, wherein performing reverse replication comprises:
   identifying one or more changes in the test environment that are to be migrated; and
   migrating the identified changes to the production environment.

4. The method of claim 1, wherein migrating the test environment comprises:
   performing application data migration from the test environment to the production environment.

5. The method of claim 4, wherein performing application data migration comprises:
   searching the test environment for entries that have been modified since a testing start time and have not been modified in the production directory; and
   migrating all the changes identified by the search from the test environment to the production environment.

6. The method of claim 4, wherein performing application data migration comprises:
   migrating application metadata from the test environment to the production environment.

7. A computer-implemented method for deployment of applications comprising:
   beginning a pilot testing of an application in a test environment on a computer system comprises a processor, wherein the test environment is configured to receive a change from a production environment;
   changing data in the production environment;
   replicating, by using the processor, the data in the test environment;
   ending the pilot testing;
   migrating a set of data created during the pilot testing from the test environment to the production environment, wherein migrating the set of data created during the pilot testing comprises performing reverse replication of application data from the test environment to the production environment;
   switching an environment for the application from the test environment to the production environment by utilizing an application production identity management services pointer; and
   storing the change in a volatile or non-volatile computer-usable medium or displaying the change on a display device.

8. The method of claim 7, wherein beginning a pilot testing of an application comprises:
   recording a starting time of testing.

9. The method of claim 7, wherein performing reverse replication comprises:
   identifying one or more changes in the test environment that are to be migrated; and
   migrating the identified changes to the production environment.

10. The method of claim 7, wherein migrating a set of data created during the pilot testing comprises:
    performing application data migration from the test environment to the production environment.

11. The method of claim 10, wherein performing application data migration comprises:
    searching the test environment for entries that have been modified since a testing start time and have not been modified in the production directory; and
    migrating all the changes identified by the search from the test environment to the production environment.

12. The method of claim 10, wherein performing application data migration comprises:
    migrating application metadata from the test environment to the production environment.

13. A computer system for deployment of LDAP applications comprising:
    a processor configured for:
      creating a test environment for testing an LDAP application, wherein data from a production environment is replicated to the test environment;
      testing an LDAP application installation configuration using the test environment;
      migrating the test environment to the production environment, wherein migrating the test environment comprises performing reverse replication of application data from the test environment to the production environment; and
      switching an application production identity management services pointer from the test environment to the production environment; and
    a volatile or non-volatile computer-usable medium for storing the update or a display device for displaying the update.

14. The system of claim 13, wherein performing reverse replication comprises:
    identifying one or more changes in the test environment that are to be migrated; and migrating the identified changes to the production environment.

15. The system of claim 13, wherein migrating the test environment comprises:
performing application data migration from the test environment to the production environment.

16. The system of claim 15, wherein performing application data migration comprises:
searching the test environment for entries that have been modified since a testing start time and have not been modified in the production directory; and
migrating all the changes identified by the search from the test environment to the production environment.

17. The system of claim 15, wherein performing application data migration comprises:
migrating application metadata from the test environment to the production environment.

18. A computer program product comprising a volatile or non-volatile computer usable medium having stored thereon executable code which, when executed by a processor, causes the execution of a process for deployment of LDAP applications, the process comprising:
creating a test environment for testing an LDAP application, wherein data from a production environment is replicated to the test environment;
testing an LDAP application installation configuration using the test environment;
migrating the test environment to the production environment, wherein migrating the test environment comprises performing reverse replication of application data from the test environment to the production environment;
switching an application production identity management services pointer from the test environment to the production environment; and
storing the update or displaying the update on a display device.

19. The product of claim 18, wherein testing an LDAP application installation configuration comprises:
recording a starting time of testing;
replicating changes made in the production environment to the test environment; and
storing the replicated changes.

20. A computer system for deployment of applications comprising:
a processor configured for:
beginning a pilot testing of an application in a test environment on a computer system, wherein the test environment is configured to receive a change from a production environment;
changing data in the production environment;
replicating, by using the processor, the data in the test environment;
ending the pilot testing;
migrating a set of data created during the pilot testing from the test environment to the production environment, wherein migrating a set of data created during the pilot testing comprises performing reverse replication of application data from the test environment to the production environment; and
switching an environment for the application from the test environment to the production environment by utilizing an application production identity management services pointer; and
a volatile or non-volatile computer-usable medium for storing the update or a display device for displaying the update.

21. The product of claim 20, wherein migrating a set of data created during the pilot testing comprises:
performing application data migration from the test environment to the production environment.

22. A computer program product comprising a volatile or non-volatile computer usable medium having stored thereon executable code which, when executed by a processor, causes the execution of a process for deployment of applications, the process comprising:
beginning a pilot testing of an application in a test environment on a computer system, wherein the test environment is configured to receive a change from a production environment;
changing data in the production environment;
replicating, by using the processor, the data in the test environment;
ending the pilot testing;
migrating a set of data created during the pilot testing from the test environment to the production environment, wherein migrating a set of data created during the pilot testing comprises performing reverse replication of application data from the test environment to the production environment;
switching an environment for the application from the test environment to the production environment by utilizing an application production identity management services pointer; and
storing the update or displaying the update on a display device.

23. The product of claim 22, wherein migrating a set of data created during the pilot testing comprises:
performing application data migration from the test environment to the production environment.

* * * * *